(12) United States Patent  
Nishide

(10) Patent No.: US 8,111,468 B2
(45) Date of Patent: Feb. 7, 2012

(54) LENS BARREL AND OPTICAL APPARATUS INCLUDING THE SAME

(75) Inventor: Akihiko Nishide, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/578,387

(22) Filed: Oct. 13, 2009

(65) Prior Publication Data

US 2010/0091390 A1     Apr. 15, 2010

(30) Foreign Application Priority Data

Oct. 14, 2008   (JP) .................. 2008-265181

(51) Int. Cl.
*G02B 15/14* (2006.01)
(52) U.S. Cl. .................. 359/694; 359/820; 359/823
(58) Field of Classification Search .......... 359/819–824, 359/694
See application file for complete search history.

(56) References Cited

U.S. PATENT DOCUMENTS

| 5,272,567 A * | 12/1993 | Inoue | 359/696 |
| 7,142,378 B2 * | 11/2006 | Hase | 359/823 |
| 2005/0104996 A1 * | 5/2005 | Makii | 348/360 |

FOREIGN PATENT DOCUMENTS

| JP | 6-289275 | 10/1994 |
| JP | 11-305100 | 11/1999 |

* cited by examiner

*Primary Examiner* — Ricky Mack
*Assistant Examiner* — Vipin Patel
(74) *Attorney, Agent, or Firm* — Canon USA Inc. IP Division

(57) ABSTRACT

A lens barrel includes a movable lens unit movable in an optical-axis direction, an actuator configured to move the movable lens unit in the optical-axis direction, a guide member configured to guide the movable lens unit in the optical-axis direction, and a guide-member-holding portion holding the guide member. The guide member is held by the guide-member-holding portion with one end thereof being in a press-fitted state and the other end thereof being in a non-press-fitted state.

9 Claims, 4 Drawing Sheets

ROOM TEMPERATURE

HIGH TEMPERATURE

LOW TEMPERATURE

LENS BARREL AND OPTICAL APPARATUS INCLUDING THE SAME

BACKGROUND OF THE INVENTION

1. Field of the Invention

The present invention relates to lens barrels and optical apparatuses including the lens barrels.

2. Description of the Related Art

In general, most components included in lens barrels of video cameras and the like are made of resin, from the viewpoints of productivity, manufacturing cost, and arbitrariness of the shape.

Components included in such a lens barrel may expand and contract with changes in the ambient temperature. Therefore, the positions of lens units often change. Consequently, the focal point may be displaced from the surface of an image pickup device, causing defocusing with high possibility.

To solve this, there are some cameras in which defocusing due to changes in temperature is corrected by moving movable sections of their lens barrels.

For example, Japanese Patent Laid-Open No. 6-289275 discloses a technique in which the focal point of a camera is corrected to be defined at a position close to the image pickup surface by moving a movable section of a lens barrel by an amount predetermined from actual measurements, calculations, or the like, in accordance with the temperature detected by a temperature sensor included in the camera. In this technique, the amount of correction of the movable section is set in accordance with the detected temperature. Therefore, if the focal point at a particular temperature varies, the focus may not be corrected. In this respect, the focal position, i.e., the positions of the respective lens units, at each particular temperature needs to be uniform.

In Japanese Patent Laid-Open No. 11-305100, an exemplary lens barrel is disclosed in which a zoom-lens-moving section is provided between a front section and a middle section, and a focus-lens-moving section is provided between the middle section and a rear section. In this lens barrel, the zoom-lens-moving section and the focus-lens-moving section are guided by a zoom guide bar and a focus guide bar, respectively, along the optical axis.

Recent video cameras, for example, include zoom lens systems having increased zoom ratios. In general, increasing the zoom ratio of a zoom lens system leads to an increase in the positional sensitivities of a plurality of lens units provided in the lens barrel.

Therefore, particularly in a zoom lens system having a high zoom ratio, positional repeatability of each lens unit with respect to temperature is important in the above-described focus correction.

A camera operable over a network can be remotely controlled and therefore tends to be used in environments with extreme temperatures. Such a situation causes a large variation in the temperature of the lens barrel. To correct the focus of such a camera, positional repeatability of each lens unit with respect to temperature is highly important.

In the lens barrel disclosed in Japanese Patent Laid-Open No. 11-305100, the ends of the zoom guide bar are secured to the front section and the middle section, respectively, in a press-fitted manner, and the ends of the focus guide bar are secured to the rear section and the middle section, respectively, in a press-fitted manner. The material and coefficient of linear expansion of the foregoing barrel sections are different from those of the guide bars. Accordingly, the amounts of expansion and contraction of the barrel sections also differ from those of the guide bars at regions where the barrel sections are secured. If there are any temperature change under such circumstances, sliding friction may occur between the guide bars and the securing regions of the barrel sections, preventing expansion and contraction of the lens barrel. Consequently, in the lens barrel disclosed in Japanese Patent Laid-Open No. 11-305100, positional repeatability of each lens unit with respect to temperature may become nonuniform.

If the amounts of deformation of components included in a lens barrel with respect to temperature are nonuniform, positional repeatability of each lens unit also becomes nonuniform.

That is, when the temperature changes from a certain level to another and subsequently returns to the initial level, the lens units may not be at their initial positions, resulting in nonuniform positional repeatability with respect to temperature.

This may cause defocusing even after the focus is corrected by moving the movable barrel sections by amounts determined in accordance with the detected temperature.

SUMMARY OF THE INVENTION

An aspect of the present invention provides a lens barrel including a movable lens unit movable in an optical-axis direction, an actuator configured to move the movable lens unit in the optical-axis direction, a guide member configured to guide the movable lens unit in the optical-axis direction, and a guide-member-holding portion holding the guide member. The guide member is held by the guide-member-holding portion with one end thereof being in a press-fitted state and the other end thereof being in a non-press-fitted state.

The lens barrel according to the above aspect of the present invention realizes high positional repeatability of the movable lens unit with respect to temperature change and therefore realizes high repeatability of the focal position. Thus, focus correction in accordance with temperature information can be assuredly performed.

Further features of the present invention will become apparent from the following description of exemplary embodiments with reference to the attached drawings.

DESCRIPTION OF THE EMBODIMENTS

Embodiments of the present invention will now be described with reference to the accompanying drawings. Lens barrels described in the following embodiments are suitable for use in optical apparatuses such as video cameras and cameras operable over networks.

First Embodiment

Figure 1:
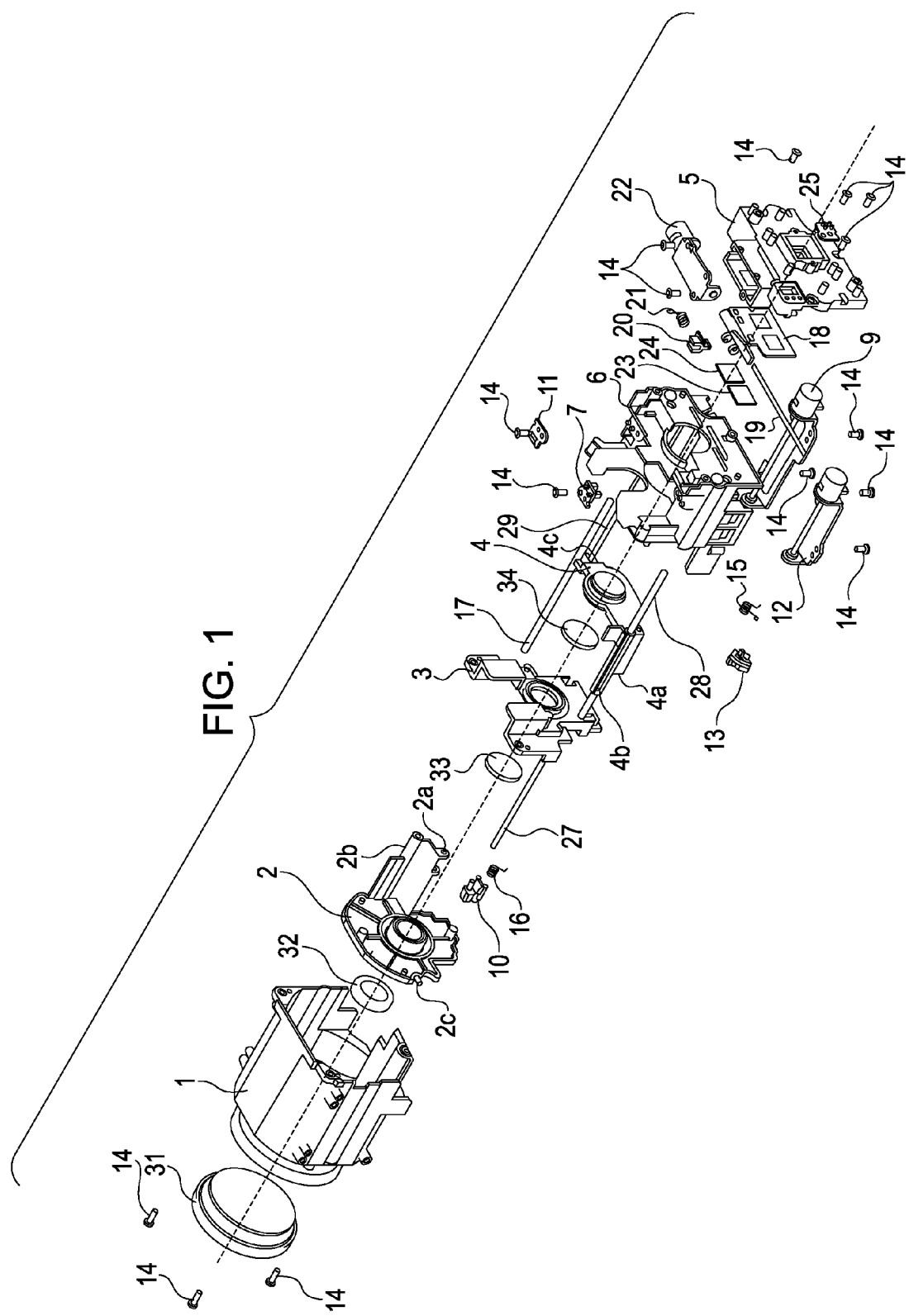
FIG. 1 is an exploded perspective view of a lens barrel according to a first embodiment of the present invention.
Figure 2:
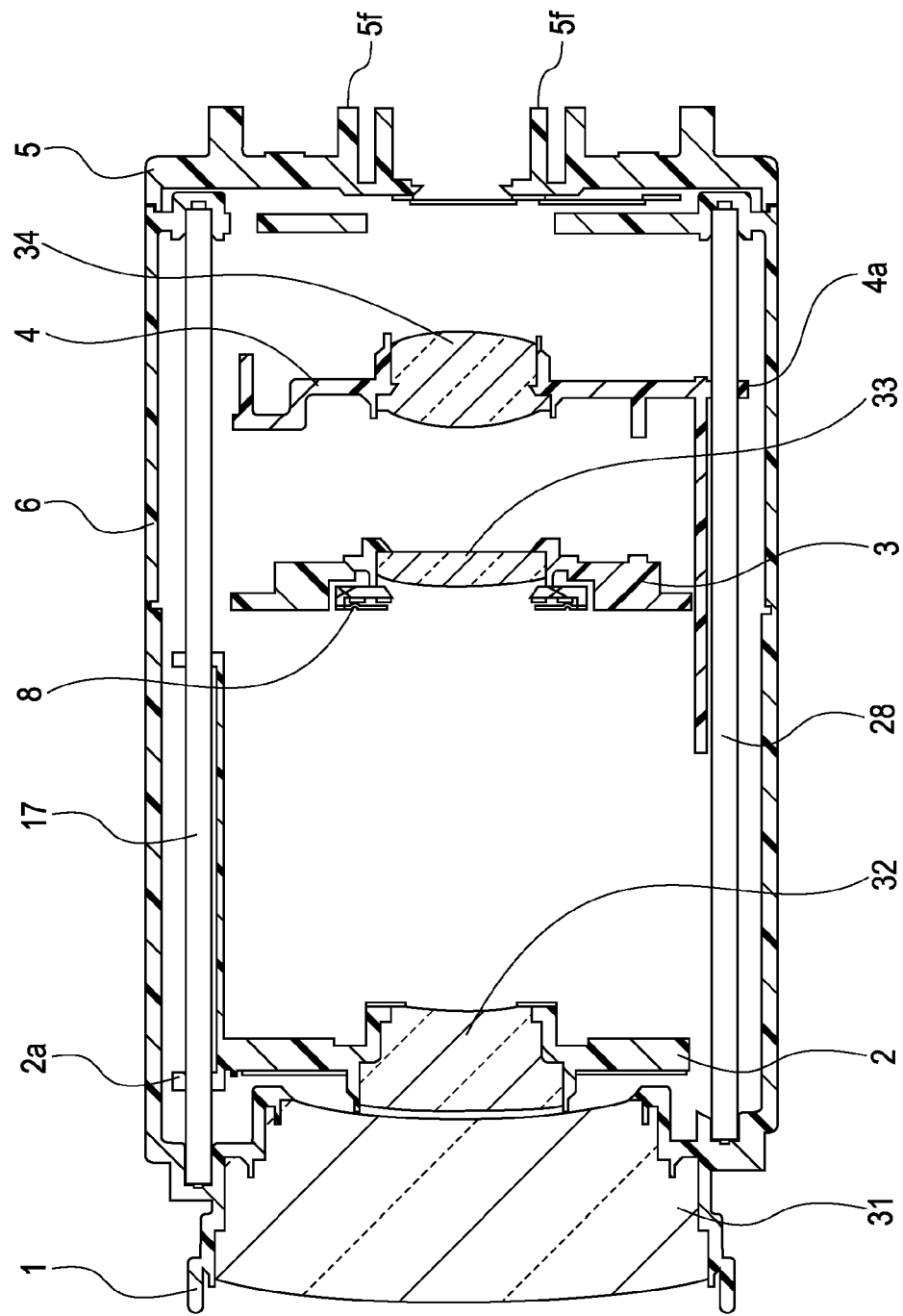
FIG. 2 is a cross-sectional view of the lens barrel according to the first embodiment.

FIG. 1 is an exploded perspective view of a lens barrel according to a first embodiment of the present invention. The lens barrel of the first embodiment is intended for a zoom lens system including four lens units. FIG. 2 is a cross-sectional view of the lens barrel at a wide-angle end with the focus being on an object at infinity. Referring to FIGS. 1 and 2, the lens barrel includes a first-unit section 1, a second-unit section 2, a third-unit section 3, a fourth-unit section 4, an image-pickup-device-holding frame 5, a rear section 6, a focus sensor 7, a light quantity adjuster 8, a zoom motor 9, a zoom rack 10, a zoom sensor 11, a focus motor 12, a focus rack 13, screws 14, a focus rack spring 15, a zoom rack spring 16, a first guide bar 17 corresponding to a first guide member, a filter frame 18, a second guide bar 19, a filter frame rack 20, a filter frame rack spring 21, a filter frame motor 22, an infrared cut filter 23, a dummy glass 24, a filter frame sensor 25, a third guide bar 27, a fourth guide bar 28 corresponding to a second guide member, and a fifth guide bar 29.

The zoom motor 9 and the focus motor 12 function as actuators that move a second lens unit 32, corresponding to a first movable lens unit, and a fourth lens unit 34, corresponding to a second movable lens unit, respectively, along the optical axis. The zoom motor 9, the focus motor 12, and the filter frame motor 22 are stepping motors.

The overall configuration of the lens barrel will now be described with reference to FIGS. 1 and 2.

The first-unit section 1 includes a lens-holding portion to which a first lens unit 31 is secured by bonding or thermal caulking.

The fourth-unit section 4 holds the fourth lens unit 34 and includes a fitting portion 4a, a sleeve 4b, and a U-shaped groove 4c. The focus rack 13 and the focus rack spring 15 are fitted to the fitting portion 4a. The sleeve 4b and the U-shaped groove 4c are respectively guided by the fourth guide bar 28, which is supported by the first-unit section 1 and the rear section 6, and the fifth guide bar 29, which is supported by the third-unit section 3 and the rear section 6, whereby the fourth-unit section 4 is movable along the optical axis while being prevented from moving in other directions. The focus motor 12 is attached to the rear section 6 with screws 14. The focus rack 13 is screwed onto the shaft of the focus motor 12. With such a configuration, the fourth-unit section 4 is driven by the focus motor 12 to move along the optical axis, so that the image plane can be corrected during focusing and zooming. In this case, a reset position of the second-unit section 2 is defined by the focus sensor 7 attached to the rear section 6.

The second-unit section 2 holds the second lens unit 32 and includes a fitting portion 2a, a sleeve 2b, and a U-shaped groove 2c. The zoom rack 10 and the zoom rack spring 16 are fitted to the fitting portion 2a. The sleeve 2b and the U-shaped groove 2c are respectively guided by the first guide bar 17 and the third guide bar 27, whereby the second-unit section 2 is movable along the optical axis while being prevented from moving in other directions. The zoom motor 9 is attached to the rear section 6 with screws 14. The zoom rack 10 is screwed onto the shaft of the zoom motor 9. The zoom sensor 11 detects the position of the second-unit section 2. Zooming is performed by moving the second-unit section 2 in such a manner that the amount of movement of the second-unit section 2 is determined in accordance with a signal from the zoom sensor 11.

The first guide bar 17 is held at ends thereof by the first-unit section 1 and the rear section 6. The third guide bar 27 is held at ends thereof by the first-unit section 1 and the third-unit section 3.

The third-unit section 3 holds a third lens unit 33 and is held by the rear section 6.

The light quantity adjuster 8 is secured to the third-unit section 3 with screws 14 and adjusts the aperture diameter with respect to the optical axis by moving blades provided therein, thereby adjusting the quantity of light that enters the image pickup device.

Sensor-receiving portions 5f of the image-pickup-device-holding frame 5 receive a unit (not shown) including the image pickup device such as a charge-coupled device (CCD).

Figure 3A:
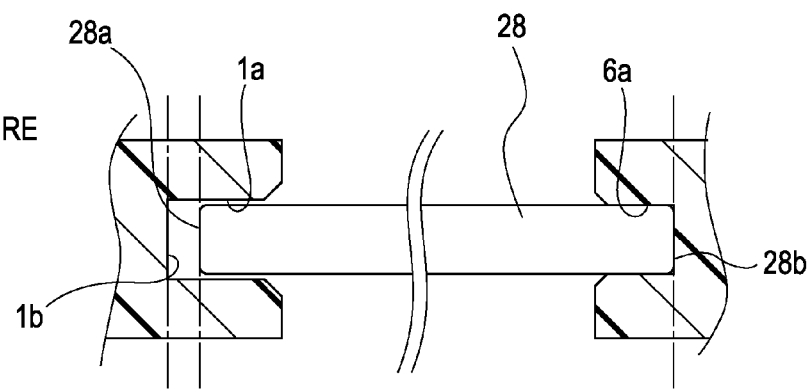
FIGS. 3A to 3C are enlarged cross-sectional views each showing a part of the lens barrel according to the first embodiment.
Figure 3B:
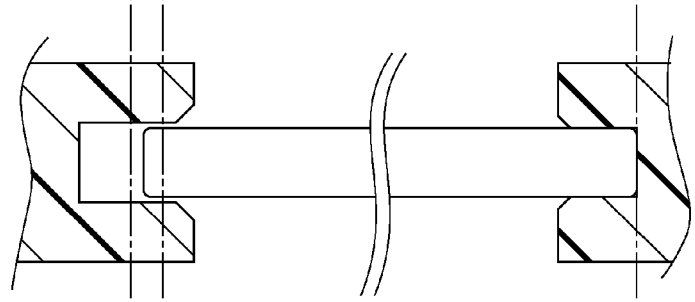
Figure 3C:
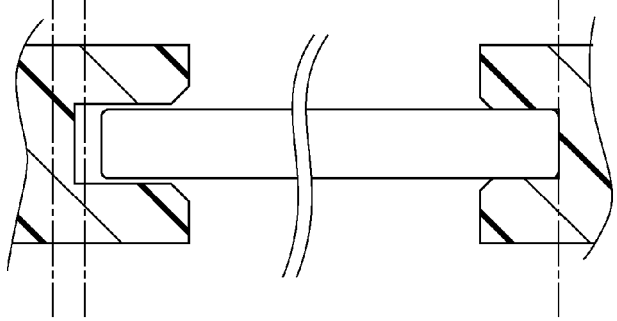

FIGS. 3A to 3C are schematic enlarged cross-sectional views each showing ends of the fourth guide bar 28. FIG. 3A shows a state where the lens barrel is at room temperature (about 23° C.). FIG. 3B shows a state where the lens barrel is at high temperature relative to room temperature. FIG. 3C shows a state where the lens barrel is at low temperature relative to room temperature.

Referring to FIGS. 3A to 3C, a first end 28a of the fourth guide bar 28 is placed inside a first hole 1a of the first-unit section 1 in a non-press-fitted state, whereas a second end 28b of the fourth guide bar 28 is placed inside a first hole 6a of the rear section 6 in a press-fitted state. The first hole 1a of the first-unit section 1 and the first hole 6a of the rear section 6 correspond to fourth-guide-bar-holding portions (a second-guide-member-holding portion).

Herein, the "press-fitted state" means a state where a guide bar is fitted into a hole whose inner diameter is smaller than the outer diameter of the guide bar on the whole or partially with the hole being, for example, D-shaped. If a guide bar that is press-fitted into a hole is solely raised, the component having the hole is also raised and does not move downward under its own weight relative to the guide bar.

The "non-press-fitted state" means a state where there is a space between the outer surface of a guide bar and the inner surface of a hole receiving the guide bar. If a guide bar that is placed in a hole in the non-press-fitted state is solely raised, the component having the hole moves downward under its own weight relative to the guide bar.

Referring to FIG. 3A, the face of the first end 28a of the fourth guide bar 28 is not in contact with a bottom 1b of the first hole 1a provided in the first-unit section 1, with a predetermined space interposed therebetween.

Figure 4:
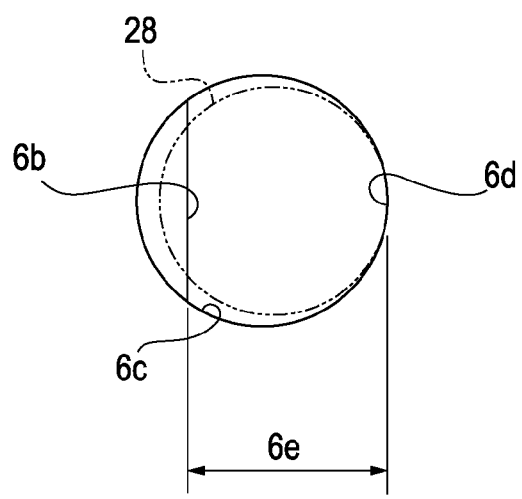
FIG. 4 is a diagram for describing a D-cut portion of the lens barrel according to the first embodiment.

FIG. 4 is a front view of the first hole 6a provided in the rear section 6. The first hole 6a, which is basically a round hole, is defined by a D-cut portion 6b and a round portion 6c, which forms a portion other than the D-cut portion 6b. The round portion 6c has an inner diameter slightly larger than the outer diameter of the fourth guide bar 28. A length 6e between the D-cut portion 6b and a point 6d on the opposite side thereof is smaller than the outer diameter of the fourth guide bar 28. In such a configuration, when the fourth guide bar 28 is inserted into the first hole 6a of the rear section 6, the fourth guide bar 28 is fixed in the first hole 6a of the rear section 6, thereby becoming in the press-fitted state. Therefore, the fourth guide bar 28 needs to be inserted into or removed from the first hole 6a of the rear section 6 with a force larger than a frictional force occurring between the inner surface, including the D-cut portion 6b, of the first hole 6a provided in the rear section 6 and portions of the outer surface of the fourth guide bar 28 that are in contact therewith. In FIG. 4, the D-cut portion 6b is schematically shown with exaggeration.

The first guide bar 17 only differs from the fourth guide bar 28 in that the positions of the press-fitted and non-press-fitted ends of the first guide bar 17 are opposite, in the optical-axis direction, to those of the fourth guide bar 28. The first guide bar 17 has one end thereof on the side of the first-unit section 1 being in the press-fitted state in a D-shaped second hole (not shown) provided in the first-unit section 1 and the other end thereof being in the non-press-fitted state in a second hole (not shown) provided in the rear section 6. There is a predetermined space between the face of the non-press-fitted end of the first guide bar 17 on the side of the rear section 6 and the bottom of the second hole of the rear section 6. The second hole of the first-unit section 1 and the second hole of the rear section 6 correspond to first-guide-bar-holding portions (a first-guide-member-holding portion).

Referring to FIGS. 3A to 3C, expansion and contraction of the lens barrel according to the first embodiment occurring with temperature changes will now be described.

FIGS. 3A to 3C each show the relationship between the first end 28a of the fourth guide bar 28 and the first hole 1a of the first-unit section 1, with the second end 28b of the fourth guide bar 28 at room temperature, shown in FIG. 3A, being set as a reference position in the direction of the optical axis.

In general, resin has a larger coefficient of linear expansion than metal. In the case of high temperature shown in FIG. 3B, the fourth guide bar 28, which is made of metal, expands more than the first-unit section 1 and the rear section 6, which are made of resin. Therefore, in FIG. 3B, the position of the face of the first end 28a of the fourth guide bar 28 relative to the first hole 1a of the first-unit section 1 differs from that in the case of room temperature shown in FIG. 3A. With the fourth guide bar 28 having only one end fixed, the fourth guide bar 28, the first-unit section 1, and the rear section 6 independently expand in the optical-axis direction. Therefore, when the temperature returns from the high level to the initial level, i.e., room temperature, the initial relationship shown in FIG. 3A between the face of the first end 28a of the fourth guide bar 28 and the first hole 1a of the first-unit section 1 can be resumed easily.

Also in a case where the state at room temperature shown in FIG. 3A changes to the state at low temperature shown in FIG. 3C, the fourth guide bar 28, the first-unit section 1, and the rear section 6 independently contract, with no frictional interactions therebetween. Therefore, the amount of deformation occurring with temperature change becomes substantially uniform. Moreover, when the temperature returns from the low level to the initial level, the initial relationship can be resumed easily. In addition, because of a space provided, at room temperature, between the face of the first end 28a of the fourth guide bar 28 and the bottom 1b of the first hole 1a of the first-unit section 1, even if the first-unit section 1 contracts more than the fourth guide bar 28 with a temperature drop, the face of the first end 28a does not come into contact with the bottom 1b. Thus, the first-unit section 1 and the fourth guide bar 28 are prevented from being pressed against each other at low temperature, so as not to interact with each other while expanding and contracting.

The first guide bar 17 also has one end thereof on the side of the first-unit section 1 being in the press-fitted state and the other end thereof on the side of the rear section 6 being in the non-press-fitted state, opposite to the case of the fourth guide bar 28. That is, only one of the ends of the first guide bar 17 is in the press-fitted state. Therefore, the same advantageous effect as in the case of the fourth guide bar 28 is obtained.

In the lens barrel according to the first embodiment, when the temperature changes, the first-unit section 1 and the rear section 6 can expand and contract along the optical axis regardless of the behaviors of the first guide bar 17 and the fourth guide bar 28. This means that the amounts of expansion and contraction with respect to the temperature are substantially uniform. Accordingly, the positions of the lens units, including the first lens unit 31 held by the first-unit section 1, relative to the image pickup device become substantially uniform at each particular temperature. Therefore, if the fourth lens unit 34 is moved by an amount that is preset in accordance with the temperature, defocusing due to temperature change can be corrected.

Whereas, in the related-art example where both ends of the guide bar are in the press-fitted state, significant friction occurs when relevant components expand and contract with temperature change, between the inner surface of the hole provided in the fixed barrel section and the outer surface of the guide bar, preventing the fixed barrel section from freely expanding and contracting.

Consequently, the amounts of expansion and contraction along the optical axis occurring within particular ranges of temperature change become nonuniform, and relevant components may not uniformly return to the initial positions even after the temperature returns to the initial level. This makes it difficult to correct defocusing by moving movable barrel sections in accordance with the detected temperature.

In FIGS. 3A to 3C, the amounts of deformation caused by the expansion and contraction of the components due to temperature changes are shown with exaggeration.

If any movable lens unit is decentered by various amounts with respect to the optical axis while being moved together with the corresponding barrel section, the image is displayed as if it were shaking, which is called image shake.

In the first embodiment, the first guide bar 17 supporting the sleeve 2b of the second-unit section 2 has the end thereof on the side of the rear section 6 being in the non-press-fitted state. With one of the ends being in the non-press-fitted state, each guide bar may vibrate perpendicularly to the optical axis. In that case, the largest vibration occurs at and near the non-press-fitted end. In the case of the first guide bar 17, the largest vibration occurs at and near the end on the side of the rear section 6, and the vibration becomes smaller toward the first-unit section 1. Referring to FIG. 2, in the second-unit section 2, if the fitting portion 2a whose position in the optical-axis direction is close to that of the second lens unit 32 vibrates perpendicularly to the optical axis, the second lens unit 32 also vibrates, causing noticeable image shake. However, the fitting portion 2a of the second-unit section 2 is positioned near the press-fitted end of the first guide bar 17 at the wide-angle end, and only moves up to a position near the third-unit section 3 even at the telephoto end. That is, regardless of the zooming position, the fitting portion 2a of the second-unit section 2 is positioned around the center of the first guide bar 17, remote from the non-press-fitted end of the first guide bar 17. Specifically, the press-fitted end of each guide bar is positioned closer to the movable range of the movable lens unit, and the non-press-fitted end of the guide bar is positioned farther from the movable range of the movable lens unit. With such a configuration, even if the first guide bar 17 vibrates when, for example, the second-unit section 2 is moved along the optical axis, the amount of image shake can be suppressed. The distance (far or close) between the end of the guide bar and the movable range is determined as the distance between the end face of the guide bar and the center of the movable range of the movable lens unit.

Such a relationship also applies to the case of the fourth guide bar 28 and the fourth-unit section 4 holding the fourth lens unit 34. Since the fourth lens unit 34 only moves up to a position near the third lens unit 33, the fitting portion 4a of the fourth-unit section 4 does not come close to the non-press-fitted end of the fourth guide bar 28 on the side of the first-unit section 1.

Thus, according to the first embodiment where one end of each guide bar is in the non-press-fitted state, vibration of the guide bar does not easily cause image shake.

In the first embodiment, the non-press-fitted end of each guide bar is positioned on the side remote from the movable barrel section. Alternatively, the non-press-fitted end of the guide bar may be positioned on the side where the sensitivity to image shake caused by the movable barrel section is lower. The sensitivity to image shake is the degree of image shake occurring when a movable lens unit is decentered by a particular amount. The higher the sensitivity to image shake, the higher the degree of image shake. The degree of the sensitivity varies with the position of the movable lens unit in the optical-axis direction.

Second Embodiment

Figure 5:
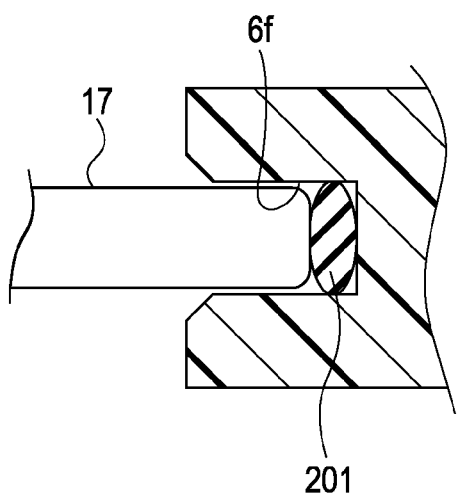
FIG. 5 is an enlarged cross-sectional view showing a part of a lens barrel according to a second embodiment of the present invention.

FIG. 5 shows a second embodiment of the present invention as a cross-sectional view of a part where the first guide bar 17 is received by the rear section 6.

The second embodiment differs from the first embodiment only in the part shown in FIG. 5 where the guide bar 17 is received by the rear section 6. The other parts are common to those in the first embodiment, and the description thereof is therefore omitted.

Referring to FIG. 5, a spacer 201 made of a resilient material such as rubber is provided in a second hole 6f of the rear section 6 so as to prevent the end face of the first guide bar 17 from coming into contact with the bottom of the second hole 6f.

In the first embodiment, a space is provided between the face of the non-press-fitted end of the guide bar and the bottom of the hole receiving the guide bar so that the end face of the guide bar does not come into contact with the bottom of the hole even if the temperature changes. In the second embodiment, a variation of the first embodiment, the spacer 201 having resilience is added in the space.

The spacer 201 is a resilient body and therefore functions as a cushion, at low temperature, between the end face of the first guide bar 17 and the bottom of the hole of the rear section 6, preventing the end face and the bottom of the hole from coming into contact and pressing against each other.

In the first embodiment, there is a possibility that the end face of the guide bar and the bottom of the receiving hole may be pressed against each other, when assembled together, because of assembly errors or the like. To avoid this, the second embodiment employs the spacer 201 so that the components can be assembled without special care.

While the second embodiment has been described focusing on the second hole 6f of the rear section 6 that receives the first guide bar 17 in the non-press-fitted manner, the second embodiment may also be applied to any other hole that receives a guide bar in the non-press-fitted manner.

Third Embodiment

Figure 6:
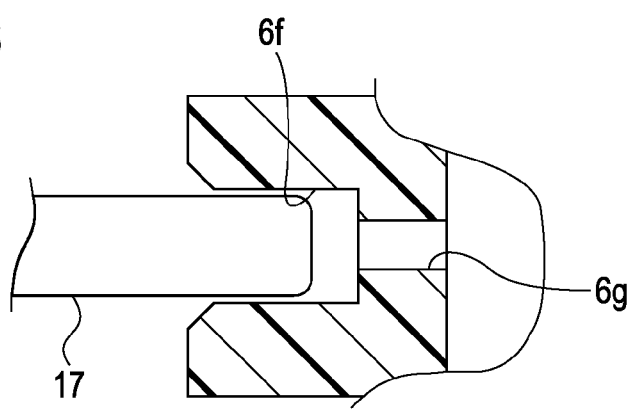
FIG. 6 is an enlarged cross-sectional view showing a part of the lens barrel according to the second embodiment.

FIG. 6 shows a third embodiment of the present invention as a cross-sectional view of a part where the first guide bar 17 is received by the rear section 6.

The third embodiment differs from the first embodiment only in the part shown in FIG. 6 where the guide bar 17 is received by the rear section 6. The other parts are common to those in the first embodiment, and the description thereof is therefore omitted.

Referring to FIG. 6, the rear section 6 has in the bottom of a second hole 6f thereof a through hole 6g whose diameter is smaller than the second hole 6f.

The through hole 6g is provided so that the first guide bar 17 can be pushed therethrough toward the first-unit section 1 with a pin or the like after the first guide bar 17 is attached to the first-unit section 1 and the rear section 6.

As in the first embodiment, a space is provided between the end face of the guide bar and the bottom of the receiving hole on the non-press-fitted side. However, there is a possibility that the end face of the guide bar and the bottom of the receiving hole may be pressed against each other, when assembled together, because of assembly errors or the like. To prevent this, the third embodiment employs the through hole 6g through which the guide bar is pushed, whereby a space can be assuredly provided between the two.

While the third embodiment has been described focusing on the second hole 6f of the rear section 6 that receives the first guide bar 17 in the non-press-fitted manner, the third embodiment may also be applied to any other hole that receives a guide bar in the non-press-fitted manner.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-265181 filed Oct. 14, 2008, which is hereby incorporated by reference herein in its entirety.

What is claimed is:

1. A lens barrel comprising:
a movable lens unit movable in an optical-axis direction;
an actuator configured to move the movable lens unit in the optical-axis direction;
a guide member configured to guide the movable lens unit in the optical-axis direction; and
a guide-member-holding portion holding the guide member,
wherein the guide member is held by the guide-member-holding portion with one end thereof being in a press-fitted state and the other end thereof being in a non-press-fitted state,
wherein a coefficient of linear expansion of the guide member and a coefficient of linear expansion of the guide-member-holding portion are different from each other,
wherein the end of the guide member that is in the press-fitted state resides closer to a movable range of the movable lens unit than the other end of the guide member,
wherein the non-press-fitted state means a state where there is a space between the other end of the guide member and a bottom surface of a hole in the guide-member-holding portion, into which the other end of the guide member is inserted, and
wherein the space is large enough for the other end of the guide member not to come into contact with the bottom surface of the hole in the guide-member-holding portion, into which the other end of the guide member is inserted, even when temperature changes.

2. The lens barrel according to claim 1, wherein the end of the guide member that is in the non-press-fitted state has a lower sensitivity to image shake caused by the movable lens unit than the other end of the guide member.

3. The lens barrel according to claim 1, wherein a space is provided between a face of the end of the guide member that is in the non-press-fitted state and a face of a corresponding one of ends, in the optical-axis direction, of the guide-member-holding portion.

4. The lens barrel according to claim 1, wherein a resilient member is provided between a face of the end of the guide member that is in the non-press-fitted state and a face of a corresponding one of ends, in the optical-axis direction, of the guide-member-holding portion.

5. The lens barrel according to claim 1, wherein the guide-member-holding portion has a hole through which the end of the guide member that is in the non-press-fitted state is to be pushed in the optical-axis direction.

6. The lens barrel according to claim 1,
wherein the movable lens unit includes a first movable lens unit and a second movable lens unit,
wherein the guide member includes a first guide member guiding the first movable lens unit in the optical-axis direction and a second guide member guiding the second movable lens unit in the optical-axis direction,
wherein the guide-member-holding portion includes a first-guide-member-holding portion holding the first guide member and a second-guide-member-holding portion holding the second guide member, and
wherein positional relationships between ends of the first guide member that are in the press-fitted and non-press-fitted states, respectively, in the first-guide-member-holding portion and between ends of the second guide member that are in the press-fitted and non-press-fitted states, respectively, in the second-guide-member-holding portion are opposite to each other in the optical-axis direction.

7. An optical apparatus comprising the lens barrel according to claim 1.

8. The lens barrel according to claim 1, wherein a resilient material is provided between the other end of the guide member and the bottom surface of the hole in the guide-member-holding portion, into which the other end of the guide member is inserted.

9. The lens barrel according to claim 1, wherein a through hole is provided in the bottom surface of the hole, into which the other end of the guided member is inserted.

* * * * *